E. E. WILLIAMS.
PIPE TURNING APPARATUS.
APPLICATION FILED FEB. 24, 1906.
909,724.
Patented Jan. 12, 1909.
2 SHEETS—SHEET 2.
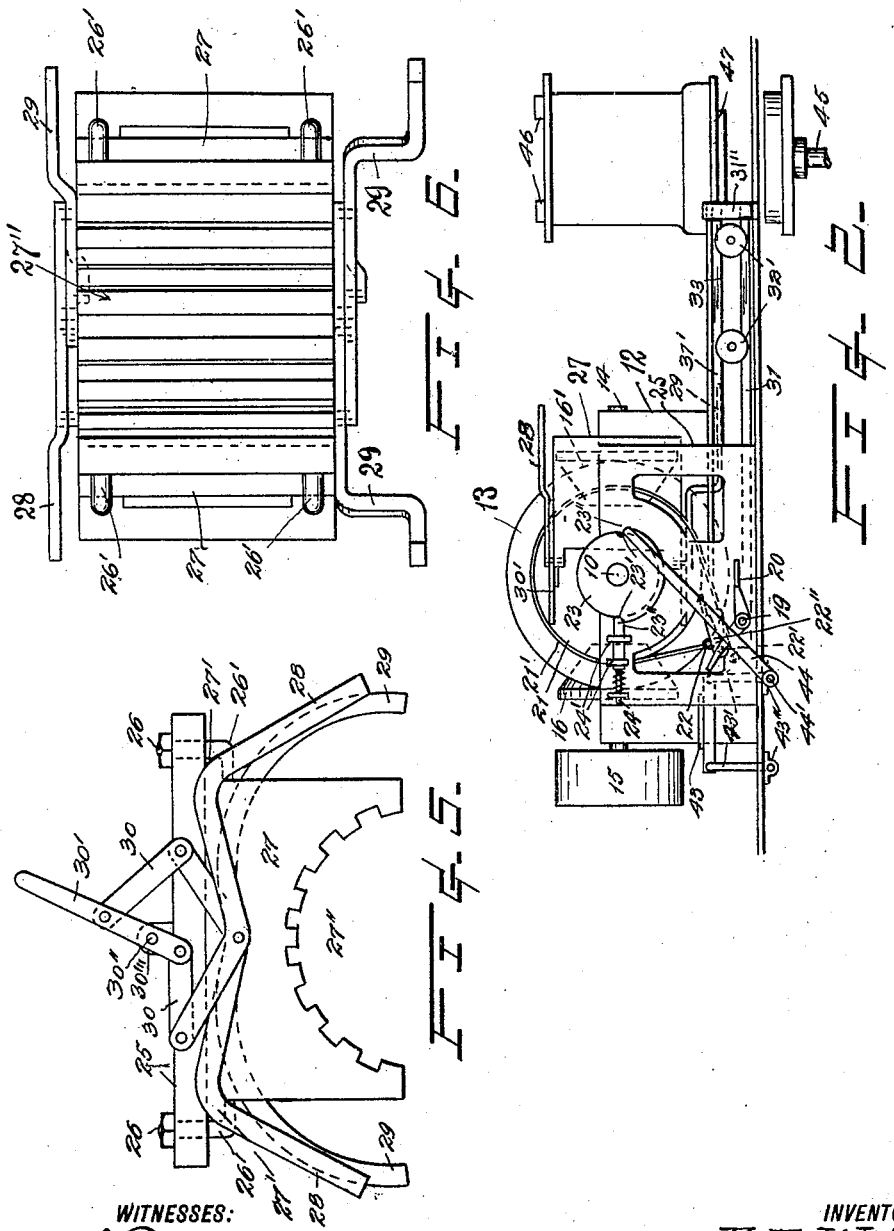
WITNESSES:
INVENTOR
E. E. Williams
BY
Pierre Barnes
ATTORNEY

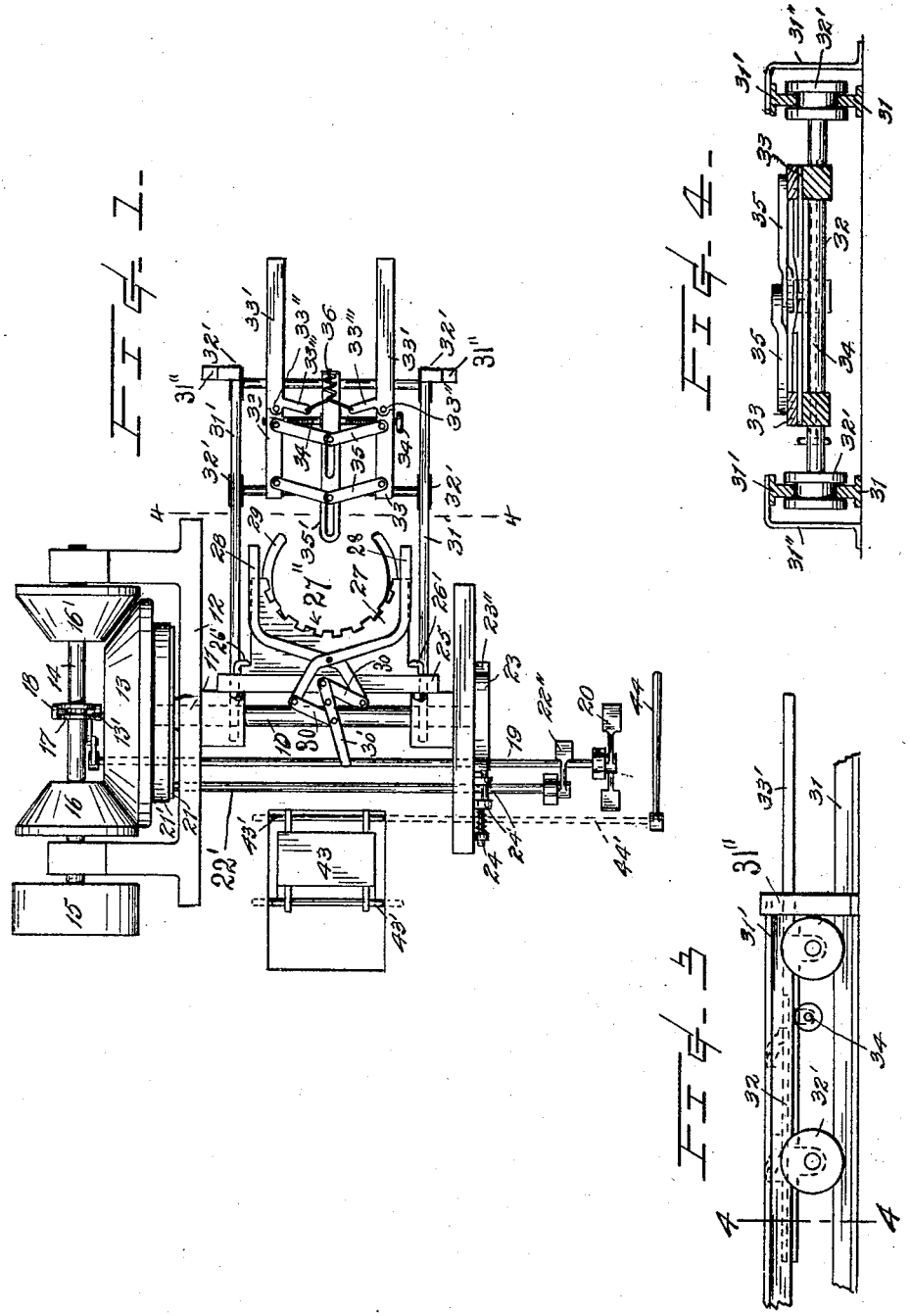

UNITED STATES PATENT OFFICE.

ELMER E. WILLIAMS, OF REDMOND, WASHINGTON, ASSIGNOR TO HARRY D. MENTZER, OF SEATTLE, WASHINGTON.

PIPE-TURNING APPARATUS.

No. 909,724.     Specification of Letters Patent.     Patented Jan. 12, 1909.

Application filed February 24, 1906. Serial No. 302,727.

*To all whom it may concern:*

Be it known that I, ELMER E. WILLIAMS, citizen of the United States, residing at Redmond, in the county of King and State of Washington, have invented certain new and useful Improvements in Pipe-Turning Apparatus, of which the following is a specification, reference being had therein to the accompanying drawings, in which—

Figure 1 is a plan view of the improved apparatus, and Fig. 2 is a side elevation of the same; Fig. 3 is a side elevation enlarged, of a portion of the base and carriage; Fig. 4 is a transverse section enlarged on the line 4—4 of Fig. 1; Fig. 5 is a plan view enlarged, of the pipe supporting cradle portion of the improved apparatus, and Fig. 6 is a front view of the same.

In manufacturing pipes from clay, especially the larger pipes, great care is required in handling them while in "green" or soft condition to prevent distortion. Pipes of this class are generally molded with the "hub" or joint flange downward, and require to be inverted after they leave the molding mechanism to prevent the relatively heavy straight portion of the pipe from distorting the hub portion, and the principal object of the present invention is to produce a simply constructed apparatus, whereby pipes formed of plastic material may be quickly reversed in position while in a "green" or soft condition and without danger of injuring the pipe.

To these ends, the invention consists in the novel construction and adaptation of devices, as will be hereinafter described in connection with the said drawings.

The reference numeral 10 designates a transverse shaft suitably mounted in journal boxes 11 of a frame 12, and having upon one end a bevel frictional wheel 13. Journaled also in the fame 12 is a longitudinal shaft 14 upon which are fixedly mounted a power driven belt-pulley 15 and two reversely disposed bevel friction-wheels 16, 16' adapted to be alternately moved into engagement with the wheel 13 by imparting a proper longitudinal movement to the shaft 14, and which is conveniently attained by a shifting mechanism engaging with a peripherally grooved collar 17 which is fixedly secured to the shaft 14. This shifting mechanism desirably comprises a bifurcated arm 18 which embraces said collar and is rigidly secured to a vibratory shaft 19 extending transversely beneath the frame and provided within easy reach of the operator, with a treadle lever 20 which may be actuated by hand or by foot. The branch of the bifurcated arm 18 which is adjacent to the driven frictional wheel 13 is extended upwardly into the orbit of a stud 13' protruding from the wheel 13 whereby the driving wheels 16 or 16', are automatically displaced out of engagement with said driven wheel when the latter has been rotated to the desired amount.

The shaft 10 is provided with a wheel 21 which is circumferentially engaged by a brake band 21' which is actuated by a vibratory arm 22 upon a shaft 22' which is controlled by a lever or pedal 22''. A disk 23 is also mounted upon the shaft 10 and is provided with diametrically opposite peripheral recesses 23' and juxtaposed abutments 23'' acting as stops for limiting the circular movement of the shaft 10 by impinging with a spring pressed latch-bolt 24 which is reciprocally mounted in apertured lugs 24' on the machine frame. Intermediate the length of the shaft 10, and rigidly connected thereto is a frame 25 provided with slots through which extend clamping bolts 26 having hooked ends 26' for engaging marginal flanges 27' of interchangeable cradles, such as 27. These cradles are made of different sizes adapted to the various diameters of pipes to be handled and are, similarly to the one illustrated, formed with a corrugated concavity 27'' in its front face corresponding with the semicircular form of the pipe for which it is intended. Pivotally connected to the respective opposite ends of the cradle are pairs of tongs 28 and 29 which are actuated by toggle devices comprised of links 30 connecting the end of each tongs part with levers 30' and upon opposite sides of the fulcrums 30'' of the latter, and which are connected with the cradle by bracket attachments 30'''.

Disposed longitudinally of the machine-frame and in line with the connected cradle, is a track composed of a pair of ground-rails 31 and a pair of top-rails 31' supported at some distance thereabove by standards 31'', and between which pairs of rails are the peripherally grooved or flanged, wheels 32' of a carriage 32 upon which the pipe is transported from the press to the turning machine. The platform of the carriage is formed of two longitudinal two-part bars 33 arranged to adjustably move toward or from each other by operating a spindle 34 having right and left-hand screw-threads cut thereon and which respectively engage with corresponding female threads formed in the said bars; and the rear parts of these bars are maintained in parallelism by toggle links 35 pivotally connected thereto and to a stationary intermediate bar 35'. The forward parts 33' of the bars 33 are connected to the latter by hinged rule joints 33'' which allows of their being swung inwardly, but not outwardly, from alinement with the respective said rear parts, and are normally retained in such alined positions by a spring 36 connected with inwardly directed arms 33''' of the bar-parts 33'.

Movement is imparted to the carriage by manual or power means to convey the pipe from the press to the turning machinery.

Included, desirably, in the invention and positioned to the rear of the shaft 10, is a platform 43 which is supported by swinging links 43' from bearings 43'' rigidly bolted or otherwise secured to the floor, and the platform is raised or lowered by a lever 44, provided upon a shaft 44' which is extended through at least one of said bearings and integrally formed with or connected to one, at least, of the links 43'. Although this platform affords great conveniece to workmen in removing pipes, it may be omitted from the machine without materially effecting its usefulness and in lieu thereof the turned-over pipes can be deposed directly upon the floor.

The parts are shown in Figs. 1 and 2 in the position they occupy when the turning portion of the invention is inoperative and the carriage has received, upon its bar-parts 31', a length of pipe from the forming mold, not shown, by the lowering of the "former" shaft 45, and which has receded, as indicated in Fig. 2, with the pipe supported entirely by the carriage. The carriage is now moved to convey the pipe into the cradle, when the jaws of the tongs 28 and 29 are actuated by levers 30' to cause them to be moved toward the axis of the pipe and respectively embrace the "floor" board 46 and the "socket" board 47 which have been previously inserted in the opposite ends of the pipe, in the customary manner. The jaws of the tongs 29 in moving inwardly engage the bar-parts 33' and permit such jaws to pass beneath the socket board 47 without obstruction. After the pipe is thus engaged by and with the cradle the latter is given a partial revolution by frictionally engaging, through the aforedescribed actuating media, the wheel 16 with the wheel 13, whereupon the shaft 10 carrying over the cradle with its load deposits the same directly upon the floor or upon a receiving platform 43. When the pipe has, in this operation, been carried over its axis of revolution, the frictional wheel 16 may be disengaged from the driven wheel 13 by the operator actuating the said shifting mechanism by the controlling lever 20 and simultaneously causing the brake-band 21' to engage the wheel 21 and through which the pipe may be gradually allowed to descend, through its weight, upon the above mentioned receiving platform. If, however, the operator should fail to release the said coupled frictional wheels, or it be desired that such disengagement be made automatically, then the revolving stud 13' will effect this function by carrying the forked arm 18 therewith to move the then driving friction wheel out of contact with the driven one. Meanwhile the latch-bolt 24 has been thrust out of its seat in one of the recesses 23' of the disk 23 and, as the latter rotates, wipes the periphery of the disk 23 which intervenes this recess and the other one and into which it is resiliently seated after being stopped by the abutment thereat, which abutment is disposed in such a position as to be engaged when the reversal of the pipe is accomplished. The pipe being deposited upon said receiving platform, or floor, is disengaged from the said tongs when the cradle is returned to its first position by a reversal of the processes just described and is then ready to receive another pipe when presented by the carriage.

What I claim as my invention, and desire to secure by Letters-Patent, is—

1. In a pipe turner, a cradle adapted to receive the pipe to be turned, oppositely operating tongs carried by said cradle and adapted to detachably engage the pipe within the cradle, and means for reversing the position of said cradle and the tongs and pipe carried thereby.

2. In a pipe turner, a shaft, means for rotating said shaft, a cradle adapted to receive the pipe to be turned, means for detachably coupling said cradle to said shaft, oppositely operating tongs carried by said cradle and adapted to detachably engage the pipe within the cradle.

3. In a pipe turner, the combination with the machine frame, of a shaft journaled therein, a cradle carried by the shaft and adapted to receive the pipe to be turned, pairs of tongs connected to the opposite ends of the cradle and operating upon the sides of the pipe to movably support the pipe in the cradle, a brake device for the shaft, means for limiting the extent of the revolution of the shaft, a driven friction wheel rigidly secured to the shaft, another shaft journaled in said frame, two driving friction wheels upon the last mentioned shaft and adapted to be interchangeably engaged
5 with said driven wheel, and means for moving said driving wheels into or out of engagement with said driven wheel.

In testimony whereof I affix my signature in presence of two witnesses.

ELMER E. WILLIAMS.

Witnesses:
PIERRE BARNES,
HARRY MENTZER.